United States Patent [19]

Starka

[11] Patent Number: 4,752,532

[45] Date of Patent: Jun. 21, 1988

[54] POLYESTER PRIMER COMPOSITION

[75] Inventor: Zita Starka, Media, Pa.

[73] Assignee: E. I. Du Pont de Nemours and Company, Wilmington, Del.

[21] Appl. No.: 925,382

[22] Filed: Oct. 31, 1986

[51] Int. Cl.$^4$ ............................................. B32B 27/36
[52] U.S. Cl. ..................................... 428/482; 524/512; 524/539; 524/902; 525/161; 525/443; 428/423.7; 428/458; 428/475.2; 428/480; 428/483
[58] Field of Search ................ 525/443, 161; 524/539, 524/512, 902; 428/423.7, 458, 475.2, 480, 482, 483

[56] References Cited

U.S. PATENT DOCUMENTS

| | | | |
|---|---|---|---|
| 4,071,578 | 1/1978 | Lasher | 525/158 |
| 4,232,090 | 11/1980 | Simon | 525/443 |
| 4,238,583 | 12/1980 | Tobias et al. | 525/443 |
| 4,614,683 | 9/1986 | Barsotti et al. | 428/220 |

Primary Examiner—Theodore E. Pertilla
Attorney, Agent, or Firm—Hilmar L. Fricke

[57] ABSTRACT

A primer composition primarily for the end of line repair of automobiles and trucks that has excellent adhesion to all types of substrates such as metal and plastics, and contains solvents and a film forming binder and pigments; wherein the binder contains about (1) 50-85% by weight, based on the weight of the binder, of a polyester of an alkylene diol, trimethylylol alkane, an aromatic dicarboxylic acid and a saturated aliphatic dicarboxylic acid having 3-10 carbon atoms wherein the hydroxyl groups of the polyester are esterified with an acid anhydride; the polyester copolymer has an acid no. of about 30-100, a hydroxyl number of about 50-120, a number average molecular weight of about 500-3,000 and a weight average molecular weight of about 1,000-6,000; and (2) 15-50% by weight, based on the weight of binder, of a methylated and butylated melamine formaldehyde agent having a degree of polymerization of about 1.5-2.0.

12 Claims, No Drawings

POLYESTER PRIMER COMPOSITION

BACKGROUND OF THE INVENTION

This invention is directed to a primer composition and in particular to primer composition that can be used to repair automobiles or trucks at the end of a production line.

Primer compositions are well known in the art and are widely used in painting of automobile and trucks in both the production process and in repair of automotive and truck finishes. Thermosetting polyester resins and coating compositions of these resins are shown in Tobias et al. U.S. Pat. No. 4,238,583 issued Dec. 9, 1980 and Lasher U.S. Pat. No. 4,071,578 issued Jan. 31, 1978. A sealerless primer is shown in Simon U.S. Pat. No. 4,232,090 issued Nov. 4, 1980. However, none of these compositions provide a high quality primer that has excellent adhesion to all types of painted, primed and unprimed substrates. Such a primer is needed for an end of the line repair primer.

In a typical manufacturing facility, after the automobile or truck has been assembled and painted, often there are small scratches, dents and other imperfections in the finish that need to be repaired. The finish may need to be sanded and primed or may not require sanding. Any primer used, must have adhesion to all types of substrates. The primer must adhere to the top coat which may be a pigment top coat or may be a clear over a pigment top coat or to the primer layer or to a bare metal or plastic substrate. Conventional primers do not have excellent adhesion to all of these substrates and there is a need for an improved primer. composition that has such excellent adhesion.

SUMMARY OF THE INVENTION

A primer composition that has excellent adhesion to all types of substrates contains solvents and about 50-85% by weight of a film forming binder and pigments in a pigment to binder weight ratio of about 5:100 to 200:100; wherein the binder contains about (1) 50-85% by weight, based on the weight of the binder, of a polyester of an alkylene diol, trimethlylol alkane, an aromatic dicarboxylic acid and a saturated aliphatic dicarboxylic acid having 3-10 carbon atoms wherein the hydroxyl groups of the polyester are esterified with an acid anhydride; the polyester has an acid no. of about 30-100, a hydroxyl number of about 50-120, a number average molecular weight of about 500-3,000 and a weight average molecular weight of about 1,000-6,000; and (2) 15-50% by weight, based on the weight of binder, of a methylated and butylated melamine formaldehyde agent having a degree of polymerization of about 1.5-2.0

DETAILED DESCRIPTION OF THE INVENTION

The primer composition forms a hard finish that has excellent adhesion to a variety of substrates such as sanded and unsanded pigmented and unpigmented topcoats, primers, cold roll steel, phosphatized steel, aluminum, polyester reinforced fiber glass, reaction injection molded urethanes, partially crystalline polyamides and other plastic substrates and provides a surface to which conventional topcoats will adhere.

The primer composition has a film forming binder content of about 50-85% by weight and correspondingly about about 20-60% by weight of a liquid carrier which usually is a solvent for the binder. The composition contains pigments in a pigment to binder weight ratio of about 5:100 to 200:100. Preferably, the film forming binder of the composition contains about 70-80% by weight of polyester and 20-30% by weight of methylated and butylated melamine formaldehyde.

The polyester used in the composition is of an alkane diol, trimethylol alkane, an aromatic dicarboxylic acid and an aliphatic dicarboxylic acid in which the hydroxyl groups of the polyester are esterified with an acid anhydride. The resulting polyester preferably has the following properties: an acid number of 60-70, a hydroxyl number of 70-95, a number average molecular weight of 1,000-2,000 and a weight average molecular weight of about 2,500-3,500.

Molecular weight is determined by gel permeation chromatography using polymethylmethacrylate as the standard.

Typical alkylene diols can be used such as trimethlylpentane diol, butylene glycol and neopentyl glycol and the like. Trimethylpentane diol is preferred. Typical trimethylol alkanes that can be used are trimethylol propane, trimethylol ethane. Pentaerythritol can also be used. Trimethylol propane is preferred.

Typical aromatic dicarboxylic acids that can be used are isophthalic acid, phthalic acid, terephthalic acid, and the like. Isophthalic acid is preferred.

Typical saturated aliphatic dicarboxylic acids that can be used have 3-10 carbon atoms and are malonic acid, succinic acid, glutaric acid, adipic acid, pimelic acid, azelaic acid, sebacic acid, and the like. Adipic acid is preferred.

Typical acid anhydrides that can be used are succinic anhydride, glutaric anhydride and trimellitic anhydride and the like. Trimellitic anhydride is preferred.

One preferred polyester is composed of trimethylpentane diol, trimethylol propane, isophthalic acid and adipic acid wherein the hydroxyl groups of the polyester are esterified with trimellitic anhydride. A particularly preferred polyester is composed of (on a weight basis) about 45-50% trimethylpentane diol, 2-6% trimethylol propane, 15-25% isophthalic acid, 15-25% adipic acid and 5-15% trimellitic anhydride; one particularly useful polyester contains 47% trimethylpentane diol, 4% trimethylol propane, 21% isophthalic acid, 19% adipic acid and 9% trimellitic anhydride and has an acid no. of about 60-70, a hydroxyl no. of about 70-90, a number average molecular weight of about 1,000-2,000 and a weight average molecular weight of about 2,500-3,500.

The polyester is prepared by conventional esterification procedures in which the components are charged into a polymerization vessel with solvents and an esterification catalyst and heated to about 100°-200° C. for about 2 hours to about 10 hours with the removal of water as it is formed in the process. The acid anhydride is then added to esterify hydroxyl groups on the polyester. Typical catalysts that can be used are organic tin compounds such as dibutyl tin dilaurate, dibutyl tin oxide and the like. Alkoxy titinates also are suitable catalysts.

The crosslinking agent used in the primer is a methylated and butylated melamine formaldehyde that has a degree of polymerization of about 1.5-2. Preferably, a 50/50 methylated and butylated melamine formaldehyde is used that has a degree of polymerization of about 1.75.

Degree of polymerization is the average number of triazine units per molecule of cross linking agent.

Typical pigments that can be used in the primer composition are filler pigments such as talc, hydrophobic silica, china clay, barytes, carbonates, silicates; metallic oxides such as titanium dioxide, zinc oxide, iron oxide; carbon black, zinc chromate, organic colored pigments such a phthalocyanine blue and green and the like.

The pigments generally are introduced into the primer composition by first forming a mill base with the polyester or with another compatible polymer or dispersant by conventional techniques such as sand grinding, ball milling, attritor grinding or two roll milling. The mill base is blended with the other constituents use in the primer composition.

Any of the conventional solvents or blends of solvents can be used provided that the selection of solvents is such that the binder constituents are compatible and give a high quality primer. The following are examples of solvents that can be used to prepare the primer composition: butanol, methyl isobutyl ketone, methyl ethyl ketone, methyl amyl ketone, toluene, xylene, acetone, ethylene glycol monobutyl ether acetate and other esters, ethers, ketones and aliphatic and aromatic hydrocarbon solvents that are conventionally used.

About 0.1–5% by weight, based on the weight of the composition, of an acid catalyst is added to cure the composition. Typically a sulfonic acid catalyst is used such as paratoluene sulfonic acid, dinonylnaphthalene sulfonic acid, dodecylbenzene sulfonic acid and the like. These can be neutralized with an amine, preferably a tertiary amine.

About 0.1–5.0% by weight, based on the weight of the binder, of a flow control agent can be added to the primer composition. Typical flow control agents are for example, polyalkyl acrylates and methacrylates, fluorinated polymers such as fluorinated esters of polyethylene glycol or propylene glycol, ethyl cellulose, silicones such as dimethyl polysiloxane or methyl phenyl polysiloxanes, polyvinylpyrrolidone having a weight average molecular weight of about 3,000 to 500,000 or mixtures of polyvinylpyrrolidone and silica.

The primer composition can be applied by conventional techniques such as spraying, electrostatic spraying, dipping, brushing, flowcoating and the like. For end of line repair of autos and trucks, conventional spraying is usually used. After application the coating is baked at an elevated temperature of about 115°–125° C. for about 20–40 minutes and then a topcoating is applied. The resulting primer usually is about 0.5 to 2 mils thick. Conventional solvent borne or water borne acrylic enamels or lacquers, acrylic polyurethanes, polyesterurethanes, alkyd enamels and the like can be applied to the primer of the invention and then baked or dried at ambient temperatures to form a durable automotive or truck finish on the substrate.

The following example illustrates the invention. All parts and percentages are on a weight basis unless otherwise indicated. Molecular weights are determined by gel permeation chromatograpy using polymethylmethacrylate as the standard.

EXAMPLE

A polyester solution was prepared by charging the following constituents into a polymerization vessel equipped with a mechanical stirrer, an electric heating mantle, a nitrogen inlet, a water separator, a thermometer, an addition funnel and a water cooled reflux condenser:

|  | Parts by weight |
|---|---|
| Portion 1 |  |
| Trimethylpentane diol | 361.73 |
| Trimethylol propane | 31.94 |
| Isophthalic acid | 163.98 |
| Adipic acid | 144.38 |
| Dibutyl tin dilaurate | 1.44 |
| Portion 2 |  |
| Methyl isobutyl ketone | 82.30 |
| Portion 3 |  |
| Trimellitic anhydride | 70.82 |
| Portion 4 |  |
| Methyl isobutyl ketone | 90.00 |
| Total | 946.59 |

Portion 1 was charged into the polymerization vessel and heated to about 200° C. Over a 4 hour period the temperature increased to about 210° C. and water was removed from the reaction mixture as it was formed. Heat was turned off and the reaction mixture was cooled to about 170°–180° C. and Portion 2 was added. Then Portion 3 was added and the reaction mixture was heated to about 190°–195° C. and held at this temperature until an acid no. of about 60–70 was reached. Then the heat was turned off and Portion 4 was added and the solution was cooled and filtered.

The resulting polyester solution had a polymer solids content of about 80%. The polyester contained about 46.80% trimethylpentane diol, 4.13% trimethylol propane, 21.22% isophthalic acid, 18.68% adipic acid, and 9.17% trimellitic acid and had an acid no. of about 60–70, a hydroxyl no. of about 70–90 and a weight average molecular weight of about 2800 and a number average molecular weight of about 1400 and a Gardner Holt Viscosity measured at 25° C. of Y.

The following mill bases were prepared:

| Zinc Chromate Mill Base | Parts by Weight |
|---|---|
| "Cymel" 1133 - (50/50 methylated and butylated melamine formaldehyde having a degree of polymerization of 1.75) | 42.12 |
| Butanol | 32.32 |
| Zinc chromate pigment | 19.68 |
| Phthalocyanine blue pigment | 0.34 |
| Carbon black pigment | 1.06 |
| Hydrophobic silica | 4.48 |
| Total | 100.00 |

The above constituents were charged into a sand mill and ground to 0.1 mil fineness while maintaining the temperature of the mill base between 38°–55° C.

| White Mill Base | Parts by Weight |
|---|---|
| Polyester solution (prepared above) | 35.74 |
| Methyl isobutyl ketone | 8.87 |
| Titanium dioxide pigment | 20.71 |
| Barytes pigment | 34.68 |
| Total | 100.00 |

The above constituents were changed into a sand mill and ground one pass to a 0.25 mil fineness.

A primer composition was prepared as follows:

|  | Parts by Weight |
| --- | --- |
| Portion 1 | |
| Zinc Chromate Mill Base - (prepared above) | 188.08 |
| White Mill Base - (prepared above) | 757.78 |
| Polyester solution (prepared above) | 94.20 |
| "Cymel" 1133 - described above | 27.20 |
| Portion 2 | |
| Polyvinylpyrrolidone solution - (10% solids in methanol of polyvinylpyrrolidone having a weight average molecular weight of about 160,000) | 16.86 |
| Portion 3 | |
| Dodecyl benzene sulfonic acid | 4.91 |
| Methyl isobutyl ketone | 50.35 |
| "Butyl Cellosolve" | 22.62 |
| Total | 1162.00 |

The constituents of Portion 1 were charged in the order shown into a mixing vessel and mixed for 2 hours. Portion 2 was added slowly and mixed for 2 hours. Portion 3 was added and mixed for 1 hour. The resulting primer composition was reduced to a spray viscosity of 30-35 seconds measured with a #2 Fisher cup with a 1/1 blend of n-butanol and methyl isobutyl ketone.

The primer was sprayed onto sanded steel panels, unprimed cold roll steel panels, phosphatized steel panels, alkyd primer coated steel panels, thermosetting acrylic enamel coated steel panels, acrylic lacquer coated steel panels, thermosetting clear/color coated acrylic enamel steel panels, fiberglass reinforced polyester panels, reaction injection molded urethane panels and partially crystalline polyamide panels. The panels were baked at 121° C. for about 30 minutes. The dry film thickness was 0.5 mils and had a gloss measured at 60° of 70.

The primer coatings had the following properties:
adhesion—Excellent
sandability—good
knife scrape resistance—good
solvent resistance—25 rubs with methyl ethyl ketone
humidity resistance
  96 hours at 38° C./100% R.H.—no blistering
  dry cross hatch tape adhesion—no failure

We claim:

1. A coating composition comprising solvents and about 50–85% by weight of a film forming binder and pigments in a pigment to binder weight ratio of about 5:100 to 200:100; wherein the binder consists essentially of about
   (1) 50–85% by weight, based on the weight of the binder, of a polyester consisting essentially of about 45–50% by weight of trimethylpentane diol, 2–6% by weight of trimethylolpropane, 15–25% by weight of isophthalic acid and 15–15% by weight of adipic acid and hydroxyl groups of the polyester are subsequently esterified with 5–15% by weight of trimellitic anhydride; the polyester copolymer has an acid no. of about 30–100, a hydroxyl number of about 50–120, a number average molecular weight of about 1,000–6,000; and
   (2) 15–50% by weight, based on the weight of binder, of a methylated and butylated melamine formaldehyde agent having a degree of polymerization of about 1.5–2.0

2. The coating composition of claim 1 in which the polyester consists essentially of 47% by weight of trimethylpentane diol, 4% by weight trimethylolpropane, 21% by weight isophthalic acid, 19% by weight adipic acid and hydroxyl groups are esterified with 9% by weight trimellitic anhydride.

3. The coating composition of claim 2 in which the melamine formaldehyde agent is 50/50 methylated and butylated and has a degree of polymerization of 1.75.

4. The coating composition of claim 1 containing about 0.1–5% by weight of an acid catalyst.

5. The coating composition of claim 4 in which the acid catalyst is dodecyl benzene sulfonic acid.

6. The coating composition of claim 1 containing about 0.1–5% by weight of a flow control agent.

7. The coating of claim 6 in which the flow control agent is polyvinylpyrolidone.

8. A substrate coated with a dried and cured layer of the coating composition of claim 1.

9. The coated substrate of claim 8 having a dried and cured layer of a topcoating composition in adherence to the coating composition.

10. A metal substrate coated with a dried and cured layer of the composition of claim 1.

11. A plastic substrate coated with a dried and cured layer of the coating composition of claim 1.

12. A polyester reinforced fiberglass substrate coated with a dried and cured layer of the coating composition of claim 1.

* * * * *